(12) United States Patent
Barnett

(10) Patent No.: US 8,978,975 B2
(45) Date of Patent: Mar. 17, 2015

(54) SYSTEMS AND METHODS FOR AUTHENTICATING NEAR FIELD COMMUNCATION FINANCIAL TRANSACTIONS

(75) Inventor: Timothy W. Barnett, Roswell, GA (US)

(73) Assignee: Accullink, Inc., Atlanta, GA (US)

( * ) Notice: Subject to any disclaimer, the term of this patent is extended or adjusted under 35 U.S.C. 154(b) by 0 days.

(21) Appl. No.: 13/185,079

(22) Filed: Jul. 18, 2011

(65) Prior Publication Data

US 2013/0020389 A1 Jan. 24, 2013

(51) Int. Cl.
| | |
|---|---|
| G06K 5/00 | (2006.01) |
| G06K 7/08 | (2006.01) |
| G06K 19/06 | (2006.01) |
| G06Q 20/00 | (2012.01) |
| G06Q 20/32 | (2012.01) |
| G06Q 20/36 | (2012.01) |
| G06Q 20/40 | (2012.01) |
| G06Q 20/20 | (2012.01) |
| H04L 29/06 | (2006.01) |
| H04W 12/02 | (2009.01) |
| H04W 12/06 | (2009.01) |
| H04W 84/10 | (2009.01) |
| H04W 4/00 | (2009.01) |

(52) U.S. Cl.
CPC .......... *G06Q 20/204* (2013.01); *G06Q 20/3278* (2013.01); *H04L 63/083* (2013.01); *H04W 12/02* (2013.01); *H04W 12/06* (2013.01); *H04W 84/10* (2013.01); *H04L 63/0492* (2013.01); *H04W 4/008* (2013.01); *H04L 2463/102* (2013.01)
USPC ............ 235/380; 235/451; 235/492; 340/5.4; 340/5.41; 340/5.42; 705/1.1; 705/18

(58) Field of Classification Search
USPC .............. 235/380, 382, 382.5, 383, 451, 492; 340/5.23, 5.24, 5.26, 5.4–5.42; 455/557, 558; 705/1.1, 17–25
See application file for complete search history.

(56) References Cited

U.S. PATENT DOCUMENTS

| | | | |
|---|---|---|---|
| 6,209,104 B1 | 3/2001 | Jalili | |
| 6,771,981 B1 * | 8/2004 | Zalewski et al. | 455/557 |
| 7,387,240 B2 | 6/2008 | Ziegler | |
| 7,526,652 B2 | 4/2009 | Ziegler | |
| 7,774,231 B2 * | 8/2010 | Pond et al. | 705/15 |
| 2004/0127256 A1 * | 7/2004 | Goldthwaite et al. | 455/558 |
| 2007/0152035 A1 * | 7/2007 | Adams et al. | 235/380 |
| 2007/0254712 A1 * | 11/2007 | Chitti | 455/558 |
| 2007/0277224 A1 * | 11/2007 | Osborn et al. | 726/2 |
| 2008/0052233 A1 * | 2/2008 | Fisher et al. | 705/40 |
| 2008/0172340 A1 | 7/2008 | Karlsson | |
| 2009/0063312 A1 * | 3/2009 | Hurst | 705/30 |
| 2009/0069050 A1 * | 3/2009 | Jain et al. | 455/558 |

(Continued)

*Primary Examiner* — Thien M Le
*Assistant Examiner* — Claude J Brown
(74) *Attorney, Agent, or Firm* — Maynard Cooper & Gale, P.C.; Jon E. Holland

(57) ABSTRACT

A system for authenticating near field communication (NFC) transactions that has an NFC merchant reader that provides an electromagnetic field and an NFC hand-held device that senses the electromagnetic field and prompts a user for a personal identifier (PI) in response to the electromagnetic field. Additionally, the NFC hand-held device wirelessly transmits the PI, and the NFC hand-held-device receives an approval code transmitted to the NFC hand-held device in response to the PI. Further, the NFC hand-held device transmits the approval code to the NFC merchant reader, and the NFC merchant reader transmits a payment request comprising the approval code.

14 Claims, 8 Drawing Sheets

(56) References Cited

U.S. PATENT DOCUMENTS

| | | |
|---|---|---|
| 2009/0143104 A1* | 6/2009 | Loh et al. ............... 455/558 |
| 2009/0177530 A1* | 7/2009 | King et al. ............... 705/10 |
| 2010/0082490 A1 | 4/2010 | Rosenblatt et al. |
| 2010/0191593 A1 | 7/2010 | Wang et al. |
| 2010/0203870 A1* | 8/2010 | Hubinak et al. ........... 455/414.1 |
| 2011/0145863 A1 | 6/2011 | Alsina et al. |
| 2011/0202417 A1* | 8/2011 | DeWakar et al. ........... 705/21 |
| 2012/0143706 A1* | 6/2012 | Crake et al. ............... 705/18 |
| 2012/0197740 A1* | 8/2012 | Grigg et al. ............... 705/16 |
| 2012/0284131 A1* | 11/2012 | Soffer et al. ............... 705/17 |

* cited by examiner

SYSTEMS AND METHODS FOR AUTHENTICATING NEAR FIELD COMMUNCATION FINANCIAL TRANSACTIONS

RELATED ART

Near Field Communication (NFC) is a wireless connectivity standard designed for short distances (e.g., 6 inches) that uses electromagnetic field induction between two loop antennas to enable communication between two electronic devices. In this regard, there is typically an initiator device and a target device. When the initiator device and the target device are brought within close proximity to one another, communication is initiated between the devices.

There are two communication modes in which the initiator device and the target device can communicate, including passive communication mode and active communication mode. In passive communication mode, the initiator device provides an electromagnetic field and the target device responds by modulating the provided electromagnetic field. In passive mode, the target device may receive its power from the initiator-provided electromagnetic field.

In active communication mode, the initiator device and the target device communicate by alternately generating their own fields. Typically, when employing active communication mode, both devices have power supplies.

Oftentimes, NFC technology is implemented as a small chip embedded in an NFC hand-held device (the initiator device). Thus, the NFC hand-held device may be used to communicate with an NFC reader device (the target device). For example, a consumer may use the NFC hand-held device in a transaction to purchase goods or services.

In some NFC hand-held devices, the consumer places the NFC hand-held device on or very near the NFC reader device, e.g., a pad on a debit card terminal, a kiosk machine, or a turnstile while a cashier is scanning in items for purchase. From the NFC chip of the NFC hand-held device, the NFC reader receives data indicative of an account identifier identifying a financial account to be debited or charged for the purchase. Additionally, the NFC hand-held device displays a key pad graphical user interface (GUI) in which the user can enter his/her personal identification number (PIN), and the NFC hand-held device transmits data indicative of the PIN entered to the NFC reader. Further, the NFC reader receives the data indicative of the account number and PIN.

The NFC reader device transmits a payment request to the financial institution corresponding to the account identifier and the PIN. If the financial institution approves the payment request, funds are charged or debited from the identified account, and at least a portion of such funds are transferred to an account of the merchant.

In other hand-held devices, the NFC hand-held device has a payment application (credit or debit card) issued by the consumer's financial institution installed on the NFC hand-held device. The application and encrypted information (including the account identifier and the PIN) are loaded on a secure area in the NFC hand-held device. The NFC hand-held device uses the NFC chip to communicate with the merchant's NFC reader device. The payment and settlement processes are the same processes used when the consumer pays with a traditional contactless or magnetic stripe credit or debit payment card.

One disadvantage of the existing NFC hand-held device and NFC reader transaction is the security surrounding such a transaction. If a person other than the consumer (owner) of the NFC hand-held device obtains possession of the NFC hand-held device, there is nothing in place to keep the person from using the NFC hand-held device to purchase goods and/or services with the consumer's NFC hand-held device. Thus, such existing technology is vulnerable to fraudulent purchases by someone other than the consumer.

In light of the foregoing, oftentimes merchants that have an NFC reader device limit the amount of the purchase in an effort to keep losses from fraudulent purchases within reasonable ranges. However, such limit also limits the use of NFC reader devices for legitimate purchases.

Furthermore, the way in which the PIN is stored, transmitted, and received during a financial transaction between the NFC hand-held device and the NFC reader device must be in such a way as to ensure that it is not transmitted, saved, or received unprotected, e.g., unencrypted. In this regard, the manner in which PINs can be handled by a merchant or other entity is regulated. Regulation adds to the complexity of a financial transaction involving the use of a PIN.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for authenticating near field communication (NFC) financial transactions. The system comprises an NFC merchant reader and an NFC hand-held device. In this regard, the system authenticates a consumer using an NFC hand-held device to purchase goods and/or services through use of the NFC merchant reader.

Specifically, the NFC merchant emits an electromagnetic field. When the NFC hand-held device is placed within close proximity to the NFC merchant reader, the hand held-device senses the electromagnetic field emitted by the NFC reader device.

In response to sensing the electromagnetic field emitted from the NFC merchant reader, the NFC hand-held device wirelessly transmits a personal identifier (PI), which can be a personal identification number (PIN), to a validating entity computing device. The NFC hand-held device receives an approval code transmitted to the NFC hand-held device in response to the PI from the validating entity computing device, thereby authenticating the consumer using the NFC hand-held device.

Once the NFC hand-held device receives the approval code, the NFC hand-held device transmits an approval request, including the approval code and the NFC hand-held device identifier, to the NFC merchant reader. The NFC merchant reader transmits a payment request comprising the approval code to the validating entity computing device. The validating entity either approves or declines the purchase of the goods and/or services, based upon the approval code.

If the validating entity approves the purchase, the merchant gives or provides the goods and/or services to the consumer. If the validating entity declines the purchase, the merchant does not give or provide the goods and/or services to the consumer.

Figure 1:
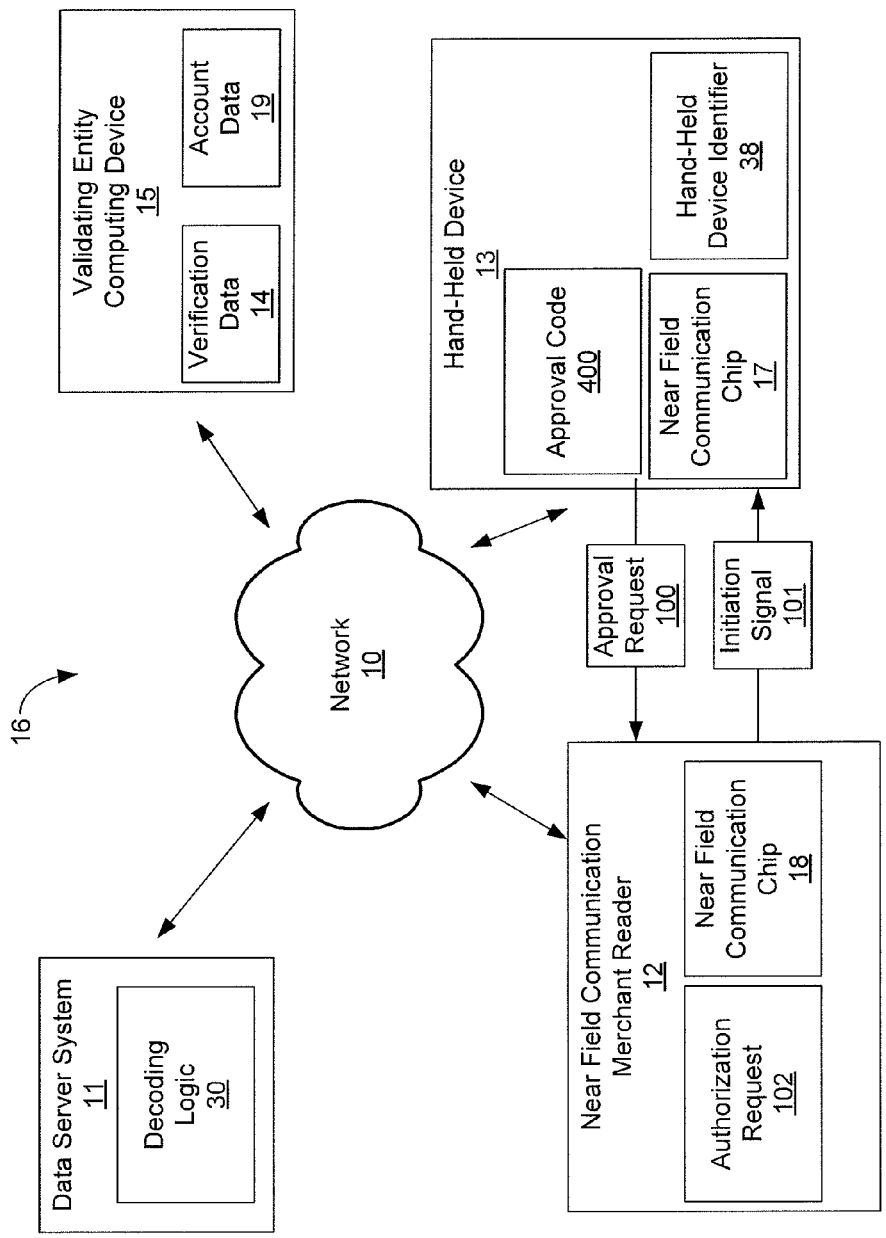
FIG. 1 is a block diagram illustrating an exemplary embodiment of a system for authenticating near field communication transactions.

FIG. 1 depicts an exemplary embodiment of a near field communication (NFC) authentication system 16. As shown by FIG. 1, the NFC authentication system 16 comprises an NFC merchant reader 12 that communicates wirelessly with an NFC hand-held device 13. In one embodiment, the NFC hand-held device 13 comprises an embedded NFC chip 17. Further, the NFC merchant reader 12 comprises an embedded NFC chip 18. Notably, when a consumer positions the NFC hand-held device 13 in close proximity to the NFC reader device 12, communication occurs between the NFC chip 18 and the NFC chip 17. In this regard, as described hereinabove, NFC is a wireless connectivity standard designed for short distances, which uses electromagnetic field induction between two loop antennas to enable communication between two electronic devices, i.e., the NFC merchant reader 12 and the NFC hand-held device 13.

The NFC hand-held device 13 may be any type of hand-held computing apparatus, such as a personal digital assistant (PDA), a cellular telephone, or other types of hand-held apparatuses capable of communicating with the NFC merchant reader 12. In one exemplary embodiment, the NFC hand-held device 13 can be initiated by the NFC merchant reader 12 to enable a user of the NFC hand-held device 13, referred to hereafter as "consumer," to purchase a goods and/or services from a merchant that is using the NFC merchant reader 12. Notably, the NFC hand-held device 13 is associated with and stores NFC hand-held identifier 38 on the NFC hand-held device 13. The NFC hand-held identifier 38 comprises a unique string of characters that only identifies the NFC hand-held device 13. Such string may be, for example, a string of alpha-numeric characters.

The NFC authentication system 16 further comprises a validating entity computing device 15. The validating entity computing device 15 comprises account data 19 and verification data 14, which are described further herein. The validating entity computing device 15 may be any computing apparatus, such as a desk-top or lap-top computer, a server, or other type of apparatus capable of processing data and communicating with the network 10, as described herein. The network 10 can comprise any known or future-developed communication network. In one exemplary embodiment, the network 10 comprises the Internet, and packets in accordance with Internet Protocol (IP) are used to communicate over the network 10. However, other types of networks or combination of networks may be used to implement the network 10.

As an example, a cellular network may be used to communicate with the validating entity computing device 15 and to provide an interface between the validating entity computing device 15 and the Internet. Yet other types of networks are possible in other embodiments. The validating entity computing device 15 may be owned, operated, and/or maintained by a financial institution that issued a financial account to the consumer.

The validating entity computing device 15 comprises account data 19, as indicated hereinabove. The account data 19 indicates various attributes about the financial account. For example, the account data 19 may include an account identifier that uniquely identifies the consumer account from other financial accounts issued by the financial institution. In one exemplary embodiment, the account identifier is a string of characters, e.g., a string of alpha-numeric characters. As an example, a typical account identifier for a credit card account is a 16 digit number, but other types of account identifiers may be used in other examples.

The account data 19 also includes a value indicative of an account balance. For example, for a credit card account, the account balance indicates the amount of funds currently borrowed from the account by the consumer and, thus, owed by the consumer to the financial institution. The account data 19 may include a value indicative of the credit limit authorized for the account. If a payment is made from the account such that the account balance exceeds the credit limit, then the payment results in an overdraft condition for which overdraft fees may be charged if the consumer has approved of such fees.

For a debit card account, the account data 19 may include data indicative of the amount of funds currently deposited into the account. If a payment is made from the account such that the account balance falls below a predefined threshold, then the payment results in an overdraft condition for which overdraft fees may be charged if the consumer has approved of such fees.

Figure 4:
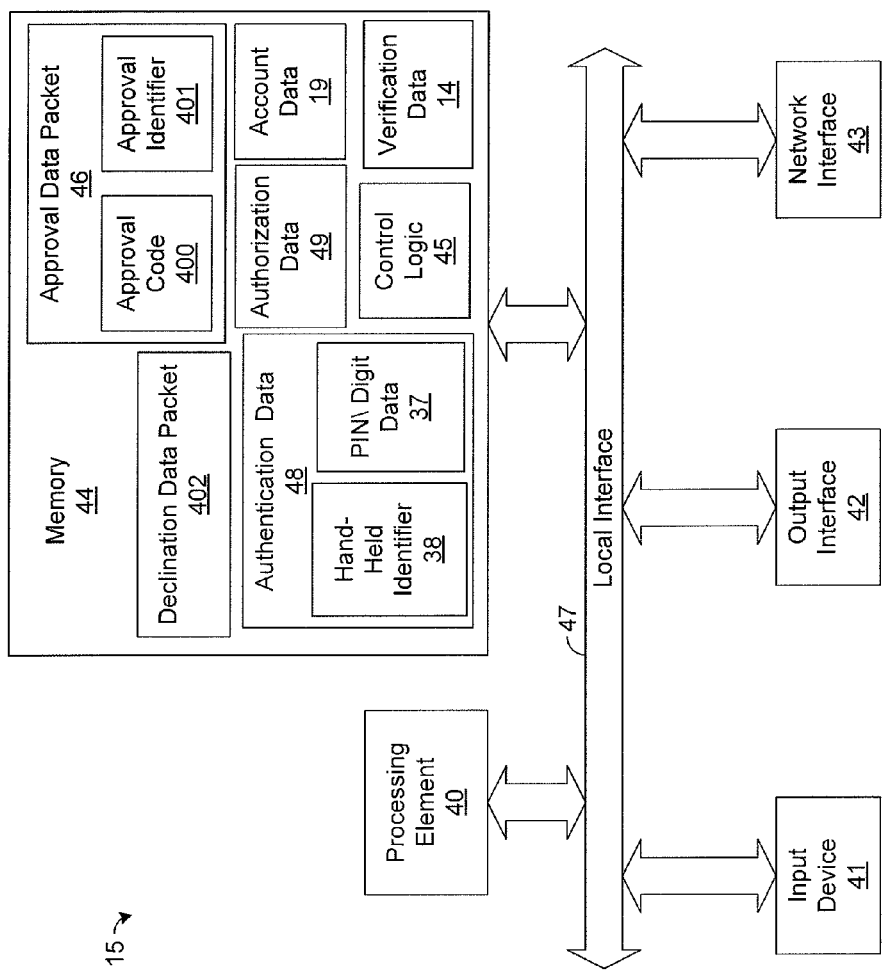
FIG. 4 is a block diagram illustrating an exemplary embodiment of a validating entity computing device, such as is depicted by FIG. 1.

The validating entity computing device 15 further comprises the verification data 14, as indicated hereinabove. The verification data 14 indicates attributes associated with each authentication process performed by the validating entity computing device 15. For example, the verification data 14 may comprise a plurality of NFC hand-held identifiers 38 associated with an approval code 400 (FIG. 2) and an approval identifier 401 (FIG. 2) or associated with a declination data packet 402 (FIG. 4). Such declination data packet 402 is not shown in FIG. 1; however, if authentication is not approved, the declination data packet 402 is stored on the on the hand-held device 13.

As shown by FIG. 1, the NFC authentication system 16 also comprises a data server system 11 that communicates with the NFC hand-held device 13 and the validating entity computing device 15 via the network 10. The data server system 11 may be any type of computing apparatus, such as a desk-top or lap-top computer, a server, or other type of apparatus capable of processing data and communicating with the network 10, as described herein. In one embodiment, the data server system 11 consists of multiple separate hardware and/or software components, which is described further herein with reference to FIG. 3.

The data server system 11 comprises decoding logic 30 on a transaction device 300. The decoding logic 30 may be hardware, software, firmware, or a combination of hardware, software or firmware. The decoding logic 30 receives a request for icon location data (not shown) from the NFC hand-held device 13 for displaying on an authentication key pad graphical user interface (GUI). The decoding logic 30 transmits icon location data (in the form of X, Y output screen and vectors) that the NFC hand-held device 13 uses to display a key pad GUI (not shown) comprising a plurality of randomly placed icons (not shown). Exemplary systems and methods for secure data entry and visual authentication are described in commonly-assigned U.S. Pat. No. 6,209,104, entitled "Secure Data Entry and Visual Authentication System and Method" and filed on Dec. 1, 1997, which claims priority to U.S. Provisional Application No. 60/033,126, entitled "Secure Data Entry and Visual Authentication System and Method" and filed on Dec. 10, 1996, both which are incorporated herein by reference.

Note that the PI identifies the consumer using the NFC hand-held device 13. The PI may be a string of characters, for example a string of alpha-numeric characters. However, the PI may also be a plurality of images in a particular sequence. Other types of PIs may be used in other embodiments of the present disclosure. In this regard, the PI may be a personal identification number (PIN).

As will be described in more detail hereafter, the NFC hand-held device 13 is placed in close proximity of the NFC merchant reader 12, which emits an electromagnetic field. The NFC hand-held device 13 senses the emitted electromagnetic field and in response, launches a program to receive location data indicative of X, Y output screen for placing icons on the key pad GUI via the network 10 from the data server system 11. The NFC hand-held device 13 translates the X, Y output screen into locations of icons (not shown) on a key pad GUI (not shown) that is displayed to the NFC hand-held device 13. The consumer selects the first icon of his/her PI by placing his/her finger on the icon corresponding to the first digit, character, or image in the consumer's PI. Location data indicative of the graphical icon selected, as described hereinabove, is transmitted back to the data server system 11 via the network 10. Once the data server system 11 receives the location data, the data server system 11 transmits and the NFC hand-held device 13 receives additional location data that the NFC hand-held device 13 uses to display icons at different and scrambled locations on the key pad GUI. This continues until the data server system 11 has received data indicative of the locations of all the digit, characters, or images of the PI.

The data server system 11 sends a request to the validating entity computing device 15 to authenticate the PI entered by the consumer and the hand-held identifier 38. The validating entity computing device 15 compares the hand-held identifier 38 and the PI entered to the account data 19 and determines if the hand-held identifier 38 and the PI entered corresponds to (e.g., matches) to the same account in the account data 19. If it does not, the validating entity computing device 15 transmits a declination data packet through the data server system 11 and to the NFC hand-held device 13. If it does, the validating entity computing device 15 transmits an approval data packet comprising an approval code 400 through the data server computing device 11 to the NFC hand-held device 13 via the network 10.

The consumer again places the NFC hand-held device 13 in close proximity to the NFC merchant card reader 12. In response, the NFC chip 17 transmits the approval request 100 comprising the hand-held identifier 38 and the unique approval code 400 received from the validating entity computing device 15 to the NFC merchant reader 12. The merchant reader device 12 transmits the approval code, the hand-held identifier 38, a purchase amount, and the NFC merchant reader identifier to the validating entity computing device 15 via the network 10. The validating entity computing device 15 compares the hand-held identifier 38 and the approval code 400 with the hand-held identifier and the approval code verification data 14, and the purchase amount with the account data 19. The validating entity computing device 15 transmits data indicating approval or declination to the NFC merchant reader 12.

Figure 2:
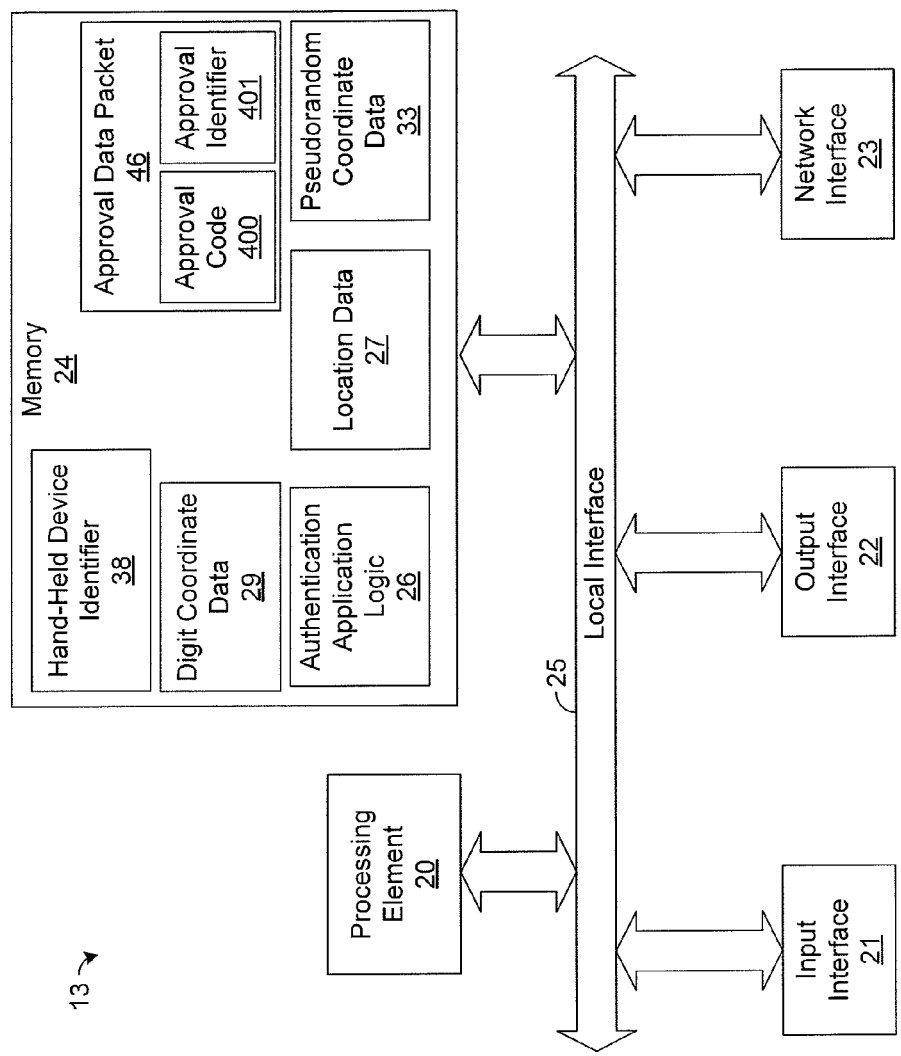
FIG. 2 is a block diagram illustrating an exemplary embodiment of an NFC hand-held device, such as is depicted by FIG. 1.

FIG. 2 depicts an exemplary embodiment of the NFC hand-held device 13. As shown by FIG. 2, the NFC hand-held device 13 comprises authentication application logic 26 stored within memory 24. In one exemplary embodiment, the authentication application logic 26 is a script loaded onto the NFC hand-held device 13. It should be noted that the authentication application logic 26 can be implemented in software, hardware, firmware or any combination thereof.

Note that the authentication application logic 26, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The NFC hand-held device 13 further comprises hand-held identifier 38, digit coordinate data 29, location data 27, pseudorandom coordinate data 33, and an approval data packet 46 or a declination data packet (not shown). Each of these is discussed further herein.

The location data 27 comprises numbers representing the X and Y points of a location on an output interface 22, and the NFC hand-held device 13 translates the coordinate data 33 having X, Y output screen into the location data 27. In this regard, the decoding logic 30 transmits the pseudorandom coordinate data 33 to the NFC hand-held device 13. The authentication application logic 26 stores the pseudorandom coordinate data 33 in memory 24. In one embodiment, the pseudorandom coordinate data 33 received is encrypted. If encrypted, the NFC hand-held device 13 decrypts the pseudorandom coordinate data 33 before translating the pseudorandom coordinate data 33 then stores the decrypted pseudorandom coordinate data 33 as the location data 27. The location data 27 describes the X, Y location on a key pad GUI (not shown) for each of a plurality of icons (not shown), which can be digits, characters, or images, for example. The NFC hand-held device 13 displays icons at physical points on the output interface 22 based upon the location data 27.

The consumer selects (or selects) the particular icon on the key pad GUI corresponding to the first digit, character, and/or image in his/her PI. The authentication application logic 26 determines the X, Y output screen of the selected icon and stores such X, Y output screen as digit coordinate data 29. The NFC hand-held device 13 transmits the digit coordinate data 29 to the data server system 11. Once the data server system 11 receives the digit coordinate data 29 for the first number in the PI, the data server system 11 transmits different coordinate data to the NFC hand-held device 13 that describes locations of the graphical icons that are different than the locations sent in the first coordinate data. Thus, the consumer enters the second digit, character, or image in his/her PI. This continues between the data server system 11 and the NFC hand-held device 13 until all the digits, characters, or images of the entire PI have been received by the data server system 11.

The hand-held identifier 38 is a unique set of characters and/or numbers that uniquely identify the hand-held device 13. The hand-held identifier 38 may be entered into the NFC hand-held device 13 via an input interface 21 and stored in memory 24 when the NFC hand-held device 13 is set up and/or registered. In another embodiment, the hand-held identifier 38 may be entered and stored when the authentication application logic 26 is transferred to, downloaded to, or otherwise stored in memory 24.

The approval data packet 46 is received from the validating entity computing device 15 via the network 10 and the data server system 11. The approval data packet 46 comprises an approval identifier (indicating approval) and an approval code 400, which is generated by the validating entity computing device 15.

The exemplary embodiment of the NFC hand-held device 13 depicted by FIG. 2 comprises at least one conventional processing element 20, such as a digital signal processor (DSP) or a central processing unit (CPU), that communicates to and drives the other elements within the NFC hand-held device 13 via a local interface 25, which can include at least one bus. Further, the processing element 20 is configured to execute instructions of software, such as the authentication application logic 26 stored in memory 24.

An input interface 21, for example, a touch screen device, keyboard, keypad, or mouse, can be used to input data from a consumer using the NFC hand-held device 13, and an output interface 22, for example, a display screen (e.g., a liquid crystal display (LCD)), can be used to output data to the consumer. In addition, a network interface 23, such as a modem, enables the NFC hand-held device 13 to communicate with the network 10.

Figure 3:
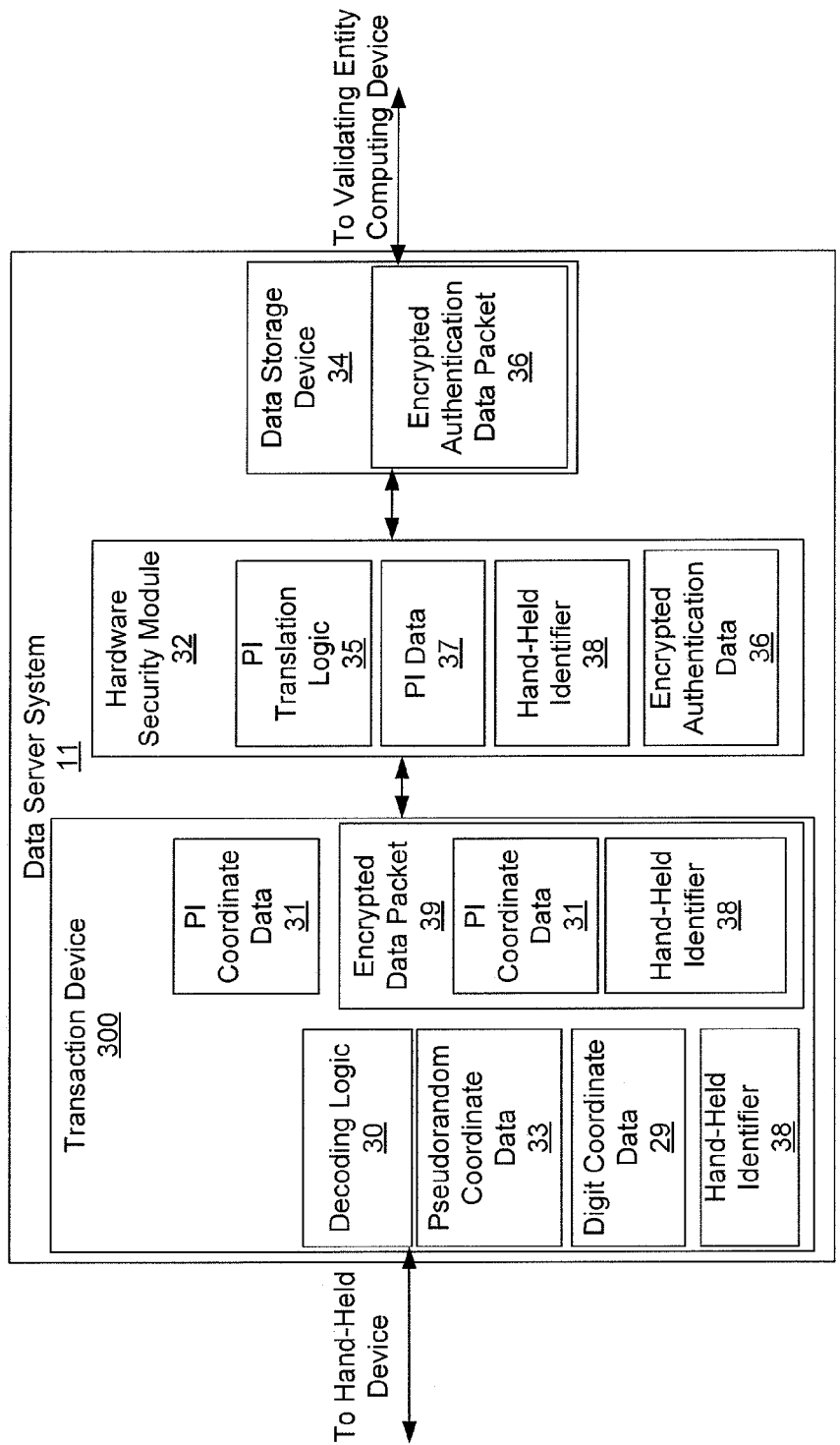
FIG. 3 is a block diagram illustrating an exemplary embodiment of a data server system, such as is depicted by FIG. 1.

FIG. 3 depicts an exemplary embodiment of the data server system 11. As shown by FIG. 3, the data server system 11 comprises transaction device 300, a hardware security module 32, and a data storage device 34. The transaction device 300 is communicatively coupled to the NFC hand-held device 13 via the network 10. In one embodiment, the network 10 is a wireless network. Furthermore, the data storage device 34 is communicatively coupled to the validating entity computing device 15 via the network 10. Additionally, the transaction device 300 is communicatively coupled to the hardware security module 32, and the hardware security module 32 is communicatively coupled to the data storage device 34.

The transaction device 300 may be any computing apparatus, such as a desk-top or lap-top computer, a server, or other type of apparatus capable of processing data and communicating with the network 10, as described herein. The transaction device 300 comprises decoding logic 30. The decoding logic 30 may be software, hardware, firmware, or a combination thereof.

Additionally, the transaction device 300 comprises the pseudorandom coordinate data 33, the digit coordinate data 29, PI coordinate data 31, the hand-held identifier 38, and the encrypted data packet 39.

As described hereinabove, the pseudorandom coordinate data 33 is data generated by the decoding logic 30. The pseudorandom coordinate data 33 comprises a plurality of X, Y output screen coordinate pairs that define a plurality of locations displayed to the key pad GUI on the output interface 22 (FIG. 2) for placement by the NFC hand-held device 13 (FIG. 1). New pseudorandom coordinate data 33 is generated after each digit coordinate data 29 is received by the transaction device 300. In this regard, after a consumer selects an icon indicative of one of the digits, characters, or images in his/her PI, the key pad GUI changes such that it has icons placed at different locations on the key pad GI on the output interface 22. In this regard, each time the decoding logic 30 generates pseudorandom coordinate data 33, the decoding logic 30 transmits the new pseudorandom coordinate data 33 to the NFC hand-held device 13 where the pseudorandom coordinate data 33 is updated on the NFC hand-held device 13.

As described hereinabove, the digit coordinate data 29 is generated by the NFC hand-held device 13 and transmitted to the transaction device 300. The digit coordinate data 29 comprises encrypted X, Y output screen coordinates indicating the points of the icons selected by the consumer when the consumer enters his/her PI. Each time digit coordinate data 29 is received from the NFC hand-held device 13, the digit coordinate data 29 is added to the PI coordinate data 31. Thus, after the consumer has finished entering his/her PI, the PI coordinate data 31 comprises X, Y output screen coordinates for each of the points of each icon selected by the consumer presenting his/her PI.

The encrypted data packet 39 is generated by the decoding logic 30. In this regard, once the PI coordinate data 31 has X, Y output screen coordinates for each of the icons selected by the consumer on the NFC hand-held device 13, the decoding logic 30 encrypts the PI coordinate data 31 and the hand-held identifier 38 in the encrypted data packet 39.

In one embodiment, the hardware security module (often call an HSM) 32 is a computing apparatus with a specific type of processor. Specifically, the hardware security module is a kind of secure cryptoprocessor that is configured to manage digital keys, among other functions. In one embodiment, the hardware security module 32 is a physical device in the form of a plug-in card or an external transmission control protocol/internet protocol (TCP/IP) security device that can be attached directly to the a computing device like the transaction device 300. A secure cryptoprocessor is a dedicated computer on a chip or microprocessor for carrying out cryptographic operations. The dedicated computer on a chip or microprocessor may be embedded in a packaging with multiple physical security measures, giving the hardware security module 32 a tamper resistant characteristic.

During operation, the hardware security module 32 receives the encrypted data packet 39 from the transaction device 300. The hardware security module 32 decrypts the encrypted data packet 39, stores the hand-held identifier 38 and translates the PIN coordinate data 31 into PI data 37. The PI data 37 is data indicative of the consumer's PI. The hardware security module 32 encrypts the hand-held identifier 38 and the PI data 37 into encrypted authentication data packet 36.

Furthermore, the data storage device 34 may be any type of storage device known in the art or future-developed for storing digital data. As an example, the data storage device 34 may be a database. Further, the data storage device 34 is capable of communicating to the validating entity computing device 15 over the network 10 and communicating with the hardware security module 32. The data storage device 34 stores the encrypted authentication data packet 36 temporarily until it is transmitted to the validating entity computing device 15 (FIG. 1).

FIG. 4 depicts an exemplary embodiment of the validating entity computing device 15. As shown by FIG. 4, the validating entity computing device 15 comprises verification data 14, account data 19, an approval data packet 46, authentication data 48, a declination data packet 402, and authorization data 49 stored in memory 44. Additionally, the validating entity computing device 15 comprises the control logic 45.

Note that the control logic 45, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

During operation, the validating entity computing device 15 receives the encrypted authentication data packet 36 (FIG. 3) from the data server system 11 (FIG. 1). The control logic 45 decrypts the encrypted authentication data packet 36 and stores the decrypted authentication data as authentication data 48. Thus, the authentication data 48 comprises the hand-held identifier 38 and the PI data 37.

Further, during operation, the validating entity computing device 15 receives a payment request from the NFC merchant reader 12 comprising an approval code, a hand-held identifier, an amount of purchase, and an NFC terminal identifier. The control logic 45 stores the received data packet as authorization data 49.

Additionally, the validating entity computing device 15 determines whether the purchase should be approved based upon the approval code, the hand-held identifier, and the amount of purchase. If the validating entity computing device 15 determines that the payment request is approved, the validating entity computing device 15 transmits an approval data packet 46 to the NFC merchant reader 12. If not, the validating entity computing device 15 transmits a declination data packet 402 to the NFC merchant reader 12.

As shown by FIG. 4, verification data 14 and the account data 19 are stored in memory 44. The verification data 14 is indicative of various attributes pertaining to the authentication of an NFC hand-held identifier and a PI. For example, the verification data 14 may include the hand-held identifier that uniquely identifies the consumer's NFC hand-held device 13 (FIG. 1). The verification data 14 may also include a unique approval code. As an example, the approval code may indicate that the NFC hand-held identifier 38 and the PI data 37 received corresponds with (e.g., matches) a hand-held device identifier and a PI stored in the account data 19 for a particular consumer.

Note that the verification attributes for a given authentication transaction are established during an approval transaction (response/request) with the data server system 11 via the network 109. Furthermore, multiple sets (e.g., files or entries) of verification data 14 are stored in the memory 44. Each set of verification data 14 corresponds to a respective authentication transaction. Each set of verification data 14 has an NFC hand-held identifier that uniquely identifies the NFC hand-held device 13 corresponding to the set of verification data 14. Any number of sets of verification data 14 may be stored in the memory 44. The verification attributes for the same authentication transaction are preferably correlated in the verification data 14 for easy access to such attributes. As an example, the sets of verification data 14 may be stored in a database, and all of the authentication transaction attributes for the same authentication transaction may be stored in the same entry of the database. Thus, an authentication transaction attribute, such as an NFC hand-held identifier, may be used as key to lookup and find the other attributes for the same authentication transaction.

The account data 19 is indicative of various attributes pertaining to a financial account of the consumer. For example, the account data 19 may include the hand-held identifier that uniquely identifies the consumer's NFC hand-held device 13 (FIG. 1), the consumer's account number, the consumer's PI number, the consumer's name, the consumer's address, a credit limit, and an account balance.

Note that the account attributes for a given consumer's financial account are established during a registration process with the financial institution that may own and operate the validating entity computing device 15. Furthermore, multiple sets (e.g., files or entries) of account data 19 are stored in the memory 44. Each set of account data 19 corresponds to a respective consumer's financial account. Each set of account data 19 has a consumer's account number, a corresponding hand-held identifier 38, and a corresponding PI that belong to the set of account data 19. Any number of sets of account data 19 may be stored in the memory 44. The financial account attributes for the same consumer are preferably correlated in the account data 19 for easy access to such attributes. As an example, the sets of account data 19 may be stored in a database, and all of the financial account attributes for the same consumer may be stored in the same entry of the database. Thus, a financial account attribute, such as an account number or NFC hand-held identifier 38, may be used as key to lookup and find the other attributes for the same financial account.

The exemplary embodiment of the validating entity computing device 15 depicted by FIG. 4 comprises at least one conventional processing element 40, such as a digital signal processor (DSP) or a central processing unit (CPU), that communicates to and drives the other elements within the validating entity computing device 15 via a local interface 47, which can include at least one bus.

An input interface 41, for example, a keyboard, keypad, or mouse, can be used to input data from a user of the validating entity computing device 15, and an output interface 42, for example, a printer or display screen (e.g., a liquid crystal display (LCD)), can be used to output data to the user. In addition, a network interface 43, such as a modem, enables the validating entity computing device 15 to communicate with the network 10.

Figure 5:
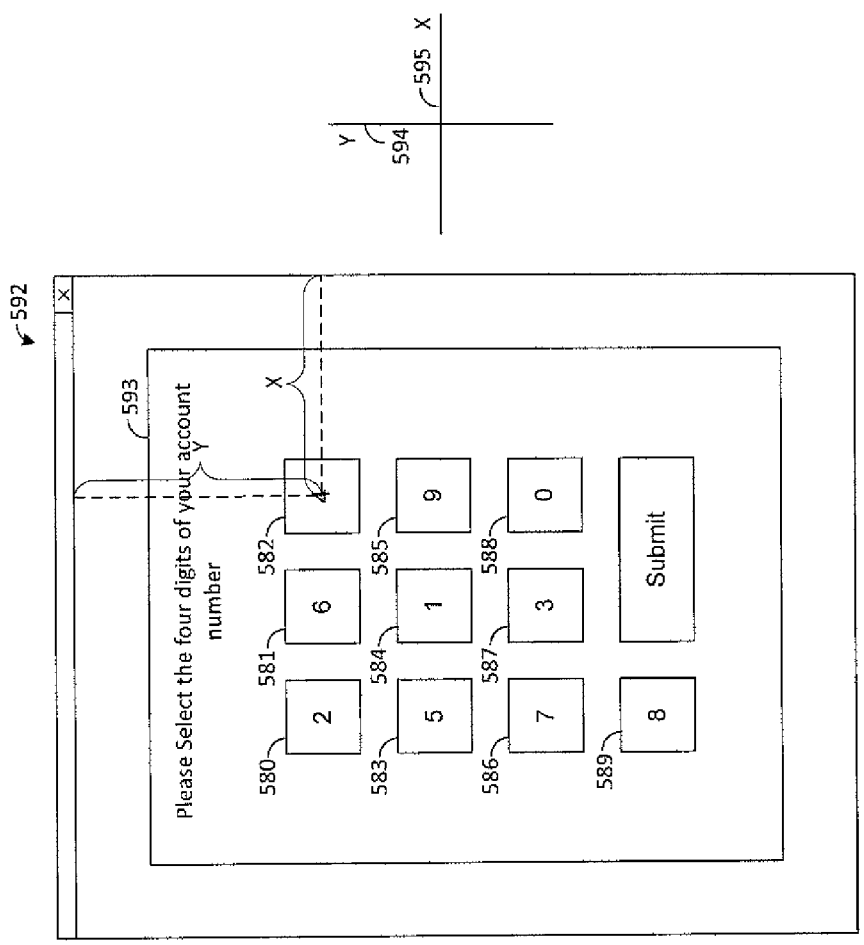
FIG. 5 is a diagram illustrating an exemplary embodiment of a GUI for soliciting at least a personal identifier (PI) from a consumer.

FIG. 5 depicts an exemplary key pad GUI 592 that may be displayed to the hand-held device 13 (FIG. 1) to capture the PI digits, character, or images selected by the consumer. The exemplary GUI 592 of FIG. 5 has a graphical character-entry pad 593 that has a plurality of graphical icons 580-589. Associated with and displayed on each graphical icon 580-589 is an image of a digit, a character, or an image. The consumer enters his or her PI by touch-selecting, for example with his/her finger, or otherwise the graphical icons 580-589 associated with the digits, characters, or images in the PI being entered. In the exemplary embodiment shown by FIG. 5, the key pad GUI 592 comprises squarely-shaped graphical icons 580-589 and numerical digits. However, characters or images may also be used in other embodiments. In one embodiment, the numerical digits may be scrambled so that they do not appear in consecutive order from lowest to highest, for example, but other arrangements are possible in other embodiments.

Associated with each of the plurality of buttons 580-589 is a location, i.e., that place on the key pad GUI where the graphical icons 580-589 appears. The location of each of the plurality of graphical icons 580-589 can be described by its X coordinates, i.e., where the graphical icons 580-589 is located on an X-axis 594, and by its Y coordinates, i.e., where the graphical icons 580-589 is located on a Y-axis 595.

For illustrative purposes, assume that the consumer utilizes the NFC hand-held device 13 (FIG. 1) to purchase goods and/or services. The consumer holds the NFC hand-held device 13 in close proximity to the NFC merchant reader 12 (FIG. 1). The coupling of the magnetic fields is such that the NFC chip 18 (FIG. 1) transmits an initiation signal 101 (FIG. 1) to the NFC chip 17 (FIG. 1). The initiation signal 101 causes an event, which activates the authentication application logic 26 (FIG. 1). Upon activation, the authentication application logic 26 transmits an initialization request to the data server system 11 to initiate random key pad generation for entering the consumer's PI.

The decoding logic 30 of the transaction device 300 receives the initialization request from the NFC hand-held device 13 (FIG. 1) when the authentication application logic 26 (FIG. 2) is started by the magnetic coupling of the NFC chip 17 and the NFC chip 18. In one embodiment, the initialization request comprises the NFC hand-held identifier 38 (AG. 1) as described hereinabove. In response, the decoding logic 30 (FIG. 1) generates pseudorandom coordinate data 33 that identifies locations of graphical icons 580-589 by their X and Y coordinates indicating where the graphical icons 580-589 are to be displayed on the graphical character-entry pad 593 that is to be displayed to the output interface 22 (FIG. 2) of the NFC hand-held device 13. The decoding logic 30 transmits the pseudorandom coordinate data 33 to the NFC hand-held device 13. In one embodiment, the pseudorandom coordinate data 33 describing the location of the plurality of the buttons 580-589 (FIG. 5) is transmitted to the NFC hand-held device 13 using secured socket layer (SSL). The NFC hand-held device 13 receives the pseudorandom coordinate data 33 and stores the pseudorandom coordinate data as pseudorandom coordinate data 33 (FIG. 2) in memory 24 (FIG. 2). The authentication application logic 26 (FIG. 2) translates the pseudorandom coordinate data 33 into data indicative of digits, characters or images and corresponding locations and stores the translated data as location data 27.

The NFC hand-held device 13 displays to the output interface 22 (FIG. 2) the key pad GUI 592 having scrambled graphical icons 580-589 thereon. In this regard, the NFC hand-held device 13 displays scrambled graphical icons on the key pad GUI 592. The consumer selects a first graphical icon 580-589 representative of the first digit, character, or image in the consumer's PI. The authentication application logic 26 determines the X, Y output screen coordinates of the icon selected and stores such X, Y output screen coordinates as the digit coordinate data 29 (FIG. 2). The NFC hand-held device 13 encrypts the digit coordinate data 29 of the graphical icon selected with a private or public key, and transmits the digit coordinate data 29 to the data server system 11. Upon receipt of the first digit coordinate data 29, the decoding logic 30 stores the digit coordinate data 29 as PI coordinate data 31 (FIG. 3), and the decoding logic 30 generates additional pseudorandom coordinate data 33 identifying different pseudorandom coordinate data 33 that is to be used in determining locations for icons that are to be displayed to the output interface 22 (FIG. 2) of the NFC hand-held device 13. The decoding logic 30 transmits the new pseudorandom coordinate data 33 to the NFC hand-held device 13. The NFC hand-held device 13 stores the received pseudorandom coordinate data 33 and translates the pseudorandom coordinate data 33 into the location data 27. The NFC hand-held device 13 displays a key pad GUI to the output interface 22 (FIG. 2) having icons located at those places on the key pad GUI described by the new location data 27. The consumer selects a second icon corresponding to the second number of his/her PI. This process continues until all the digits of the PI have been entered into a different scrambled key pad GUI and received by the data server system 11. In this regard, the authentication application logic 26 continues to send digit coordinate data 29 until all the numbers of the PI have been sent to the decoding logic 30 and stored in the PI coordinate data 31.

Once the process of transmitting coordinate data 33, displaying icons based on the coordinate data 33, and receiving data indicative of selected icons on the NFC hand-held device 13 is complete, the decoding logic 30 stores PI coordinate data 31, as indicated hereinabove. The data server system 11 encrypts the PI coordinate data 31 and the hand-held identifier 38 into an encrypted data packet 39. In one embodiment, the encrypted data packet 39 is encrypted with a private or public key. The decoding logic 30 then transmits the encrypted coordinate data packet 39 to the hardware security module 32.

The hardware security module 32 receives the encrypted coordinate data packet 39 from the decoding logic 30. The PI translation logic 35 decrypts the encrypted coordinate data packet 39 and translates the PI coordinate data 31 into the digits, characters or images of the PI entered by the consumer on the NFC hand-held device 13 and stores such data as PI data 37. Translation of the encrypted coordinate data packet 39 into digits, characters or images of the PI is described in commonly-assigned U.S. Pat. No. 7,526,652, entitled "Secure PIN Management" and filed on Jan. 26, 2004. The translated PI coordinate data 31 is stored on the hardware security module 32 as PI digit data 37. Additionally, the hand-held identifier 38 is stored on the hardware security module 32.

The hardware security module 32 encrypts the PI data 37 and the hand-held identifier 38 into encrypted authentication data packet 36 with a public key and transmits the encrypted authentication data packet 36 to the data storage device. The data storage device 34 stores the encrypted authentication data packet 36 temporarily before the encrypted PI data 35 is transmitted to the validating entity computing device 15.

The validating entity computing device 15 receives the encrypted authorization data packet 36 from the data server system 11. The validating entity computing device 15 decrypts the encrypted authorization data packet 36 and stores the decrypted authorization data as authentication data 48. Thus, the authentication data 48 comprises the hand-held identifier 38 and the PI data 37.

As described hereinabove, the validating entity computing device 15 comprises account data 19 and verification data 14. The account data 19 comprises data indicative of an account number of a consumer associated with a hand-held identifier 38, PI data 37, available credit or debit amount. The account number may be associated with data other than the data enumerated hereinabove in other embodiments. Further, the verification data 14 comprises data indicative of the authentication process. In this regard, the verification data 14 comprises data indicative of a hand-held identifier 38 associated with an approval code 400 and an approval identifier 401. The hand-held identifier 38 may be associated with data other than the data enumerated hereinabove in other embodiments.

Once the hand-held identifier 38 and the PI data 37 are decrypted, the hand-held identifier 38 is stored in the authentication data 48 associated on with the PI data 37. The control logic 45 searches the account data 19 for the hand-held identifier 38. Once the hand-held identifier 38 is located in the account data 19, the control logic 45 compares (e.g., matches) the PI data 37 received with the PI associated with the hand-held identifier 38 located in the account data 19. Note that the control logic 45 could also locate the PI data 37 in the verification data 14 and compare the hand-held identifier associated with the located PI data 37 in the verification data 14 to determine approval or declination of authentication.

If the hand-held identifier 38 and the PI data 37 received do not correspond to (e.g., match) the hand-held identifier and the PI data in the account data 19 corresponding to the consumer's account, the control logic 45 generates a declination data packet 402, which may comprise a declination identifier indicating that the authentication has been declined. The control logic 45 generates a declination data packet 402 and stores the hand-held identifier 38, which the control logic 45 associates with a declination identifier, in the verification data 14. The control logic 45 further transmits the declination data packet 402 to the data server system 11, the data server system 11 transmits the declination data packet 402 to the NFC hand-held device 13, and the NFC hand-held device 13 notifies the consumer that authentication has been declined.

If the hand-held identifier 38 and the PI 37 correspond to (e.g., match) the hand-held identifier data and the PI data in the account data 19 for the account number of the consumer, the control logic 45 randomly generates an approval code 400 and an approval identifier 401 and stores the approval code 400 and the approval identifier 401 in the verification data 14, and the control logic 45 stores the hand-held identifier 38 in the verification data 14 associated with the approval code 400 and the approval identifier 40. Notably, the approval code 400 is a unique identifier generated by the control logic to identify the particular authentication of the hand-held identifier 38 and the PI data 37. The control logic 45 transmits the approval data packet 46 to the data server system 11, the data server system 11 transmits the approval data packet 46 to the NFC hand-held device 13, and the NFC hand-held device 13 notifies the consumer that authorization has been approved.

Note that there are various ways in which the consumer can be notified of declination or approval. For example, the authentication application logic 26 may sound an alarm or display a window to the output interface 22 (FIG. 2).

If the consumer is approved, the consumer holds the NFC hand-held device 13 within close proximity to the NFC merchant reader 12. The NFC hand-held device 13 transmits an approval request 100 to the NFC merchant reader 12, which includes the hand-held identifier 38 and the approval code 400, which was received from the validating entity computing device 15.

The NFC merchant reader 12 transmits a payment request to the validating entity computing device 15. The payment request comprises the hand-held identifier 38, the approval code 400, the amount of the purchase, and an NFC merchant reader identifier (not shown). The control logic 45 stores the hand-held identifier 38, the approval code 37, the amount of the purchase, and the NFC merchant reader identifier as authorization data 49. The control logic 45 searches the verification data 14 for the hand-held identifier 38 or the approval code 400. If the control logic 45 locates the hand-held identifier 38 or the approval code 400 in the verification data 14, the validating entity computing device 15 then searches the account data 19 for the hand-held identifier 38, which is associated with a consumer's account number, the consumer's PI data 37, and a credit amount or balance of a debit account. The control logic 45 compares the amount of purchase from the payment request to the credit amount or balance of the debit account and determines whether the amount of purchase exceeds the credit amount available or the balance of the debit account. If it does not, the control logic 45 transmits data indicative of approval to the NFC merchant reader 12. If the control logic 45 locates the hand-held identifier 38 in the verification data 14 associated with a declination data packet, the validating entity computing device 15 transmits data indicative of declination to the NFC merchant reader 12.

The merchant reader device 12 receives either an approval data packet 46 or a declination data packet 402 from the validating entity computing device 15. If the merchant reader device 12 receives an approval data packet 45, the purchase of the goods and/or services initiated by the consumer is finalized, and the consumer is given or provided the goods and/or services. If the merchant reader device 12 receives a declination data packet 402, the purchase of the goods and/or services initiated by the consumer is declined, and the consumer is not given or provided the goods and/or services.

Figure 6A:
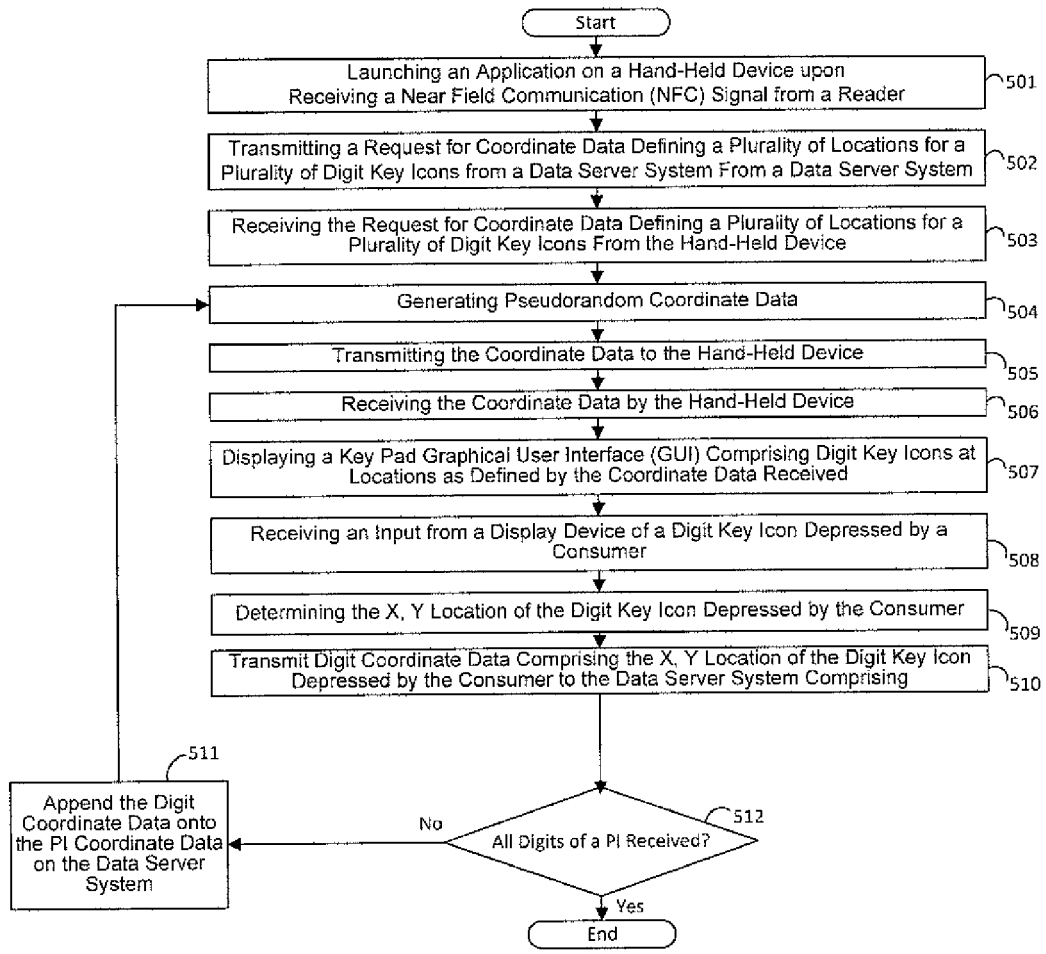
FIG. 6A is a flow chart illustrating an exemplary method implemented by an NFC hand-held device, such as is depicted by FIG. 1.

FIG. 6A is a flowchart depicting exemplary architecture and functionality of the financial payment system 16 (FIG. 1) configured to allow a data server system 11 to capture digit coordinate data 29 (FIG. 3) when a consumer uses an NFC hand-held device 13 (FIG. 1) to purchase goods and/or services. Assume that the user decides to purchase a television (TV) and use his/her NFC hand-held device 13 to pay for the TV at a cost of $1,000. The consumer places his/her NFC hand-held device 13 within close proximity to the NFC merchant reader 12.

When the consumer places his/her NFC hand-held device 13 within close proximity to the merchant reader device 12, the NFC hand-held device 13 receives an initiation signal 101 (FIG. 1) from the NFC merchant reader 12 as indicated in step 501. Such communication of the signal is effected via the NFC chips 17 and 18 located on the NFC hand-held device 13 and the NFC merchant reader 12, respectively. The received initiation signal 101 causes an event on the NFC hand-held device 13, and the NFC hand-held device 13 launches the authentication application logic 26. In this regard, the authentication application logic 26 executes when the initiation signal 101 from the NFC merchant reader 12 is detected by the NFC hand-held device 13.

In step 502, in response to the electromagnetic signal, the authentication application logic 26 on the NFC hand-held device 13 transmits an initialization request to the transaction device 300 (FIG. 1) of the data server system 11 (FIG. 1) for pseudorandom coordinate data 33 (FIG. 3). Such initialization request comprises the hand-held identifier. The pseudorandom coordinate data 33 requested defines a plurality of locations for graphical icons 580-589 (FIG. 5) to be displayed in a key pad GUI 593 (FIG. 5). In one embodiment, the initialization request sent to the data server system 11 comprises hand-held identifier 38 (FIG. 2). Further, the authentication application logic 26 may encrypt the initialization request prior to sending the initialization request to the data server system 11.

In step 503, the transaction device 300 (FIG. 3) of the data server system 11 receives data 102 for the pseudorandom coordinate data 33 from the NFC hand-held device 13. In step 504, the transaction device 300 generates pseudorandom coordinate data 33, which comprises X, Y output screen identifying the location of a plurality of digits for the key pad GUI 593. In step 505, the data server system 11 transmits the pseudorandom coordinate data 33 to the authentication application logic 26 of the hand-held device 13. In one embodiment, the pseudorandom coordinate data 33 is encrypted with a private key.

In step 506, authentication application logic 26 receives the pseudorandom coordinate data 33 from the data server system 11. In step 507, the authentication application logic 26 displays a key pad GUI 593 comprising graphical icons 580-589 at locations on the key pad GUI 593 as defined by the pseudorandom coordinate data 33.

In step 508, the consumer selects one of the graphical icons corresponding to one of the digits in his/her PI and the NFC hand-held device 13 receives an input from the display interface 22 (FIG. 2) of the graphical icon selected by the consumer. In step 509, the authentication application logic 26 determines the X, Y location (digit coordinate data 29) of the graphical icon selected by the consumer.

In step 510, the NFC hand-held device 13 transmits the digit coordinate data 29 defining the location of the graphical icon selected by the consumer to the data server system 11. In step 512, the data server system 11 determines if X, Y output screen representing all the digits in the PI have been received from the NFC hand-held device 13.

If all the digits in the PI have not been received from the NFC hand-held device 13 in step 512, the data server system 11 appends the digit coordinate data n received onto PI coordinate data 31 (FIG. 3) in step 511. Thereafter, the process begins again at step 504 with the transaction device 300 generating different pseudorandom coordinate data 33 defining different X, Y locations for a plurality of differently located graphical icons on the key pad GUI. If the data server system 11 has received digit coordinate data 29 representing all the digits in the PI in step 512, the method ends, and the data server system 11 has captured the digit coordinate data 29 for each of the digits in the PI number of the consumer from the NFC hand-held device 13 and stored such the digit coordinate data 29 for each graphical icon selected on the NFC hand-held device 13 as PI coordinate data 31.

Thus, in the example provided, the authentication application logic 26 may display the key pad GUI 593 having the graphical icons 580-589. The consumer's PI may be "4567." The consumer selects the first number in his/her PI, for example graphical icon 582 (representing the number 4). The authentication application logic 26 transmits the X, Y coordinates of the graphical icon 582 to the data server system 11, and the data server system 11 transmits back a new and different key pad GUI 593 having graphical icons 580-589 located differently on the key pad GUI 593. This continues until each of the numbers of the consumer's PI is selected.

Figure 6B:
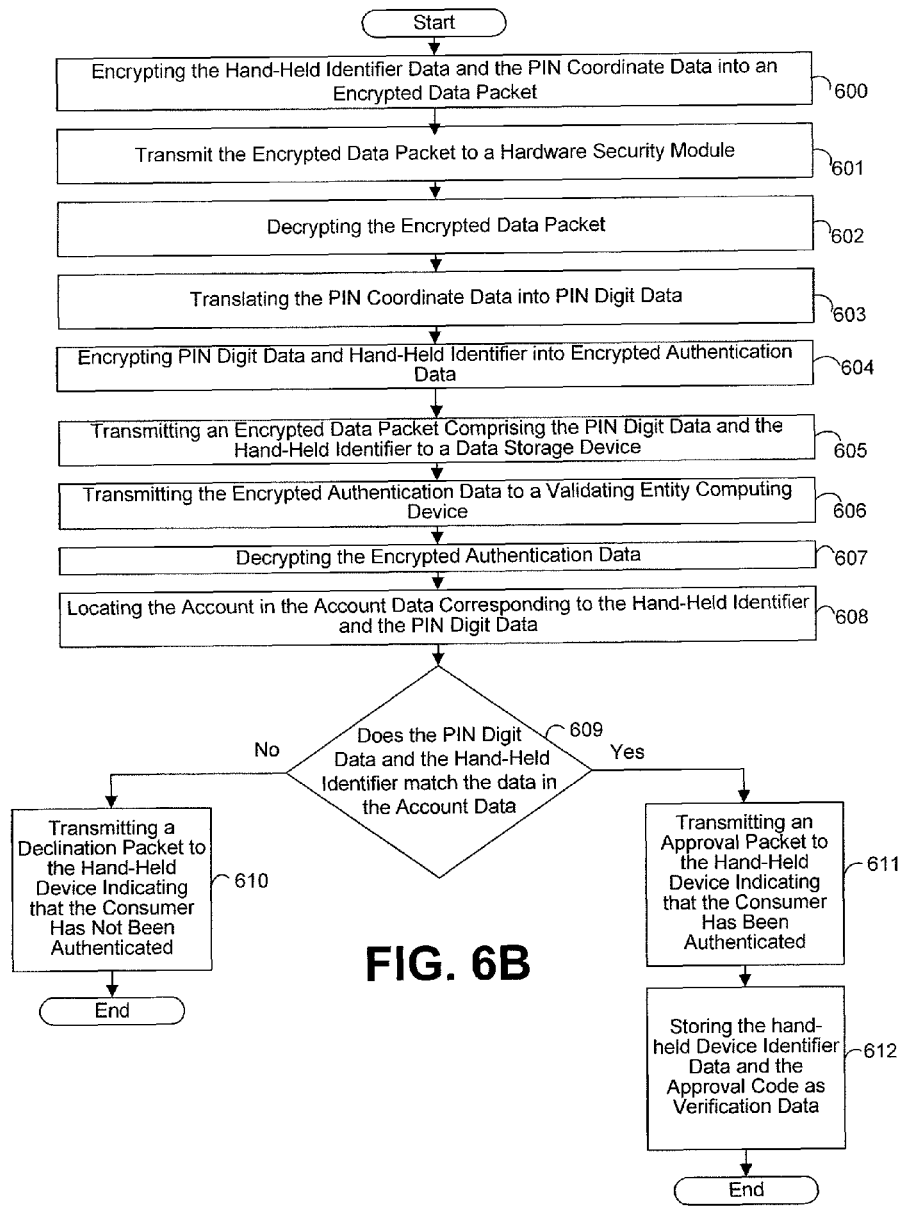
FIG. 6B is a flow chart illustrating an exemplary method implemented by a data server system and a validating entity computing device, such as are depicted by FIG. 1.

FIG. 6B is a flowchart depicting exemplary architecture and functionality of the financial payment system 16 (FIG. 1) for authenticating the "6567," with the hand-held identifier 38 (FIG. 2) associated with the consumer's hand-held device 13. As described hereinabove, the data server system 11 (FIG. 1) stores in memory (not shown) the PI coordinate data 31 (FIG. 3), which comprises each of the X, Y locations of each of the graphical icons 580-589 (FIG. 5) selected. Further, the data server system 11 stores the hand-held identifier 38 (FIG. 3) received upon initiation from the NFC hand-held device 13 (FIG. 1).

In step 600, the data server system 11 encrypts the hand-held identifier 38 and the PI coordinate data 31 into an encrypted data packet 39 (FIG. 3). Such encryption may be made using a private or public key. In step 601, the data server system 11 transmits the encrypted data packet 39 to the hardware security module 32.

In step 602, the PI translation logic 35 (FIG. 3) of the hardware security module 32 (FIG. 3) decrypts the encrypted data packet 39. In step 603 and the PI translation logic 35 translates the PI coordinate data 31 into PI digit data 37 (FIG. 3), which comprises the numerical digits of the PI. In step 604, the PI translation logic encrypts the PI Digit Data 37 and the hand-held identifier 38 into an encrypted authentication data packet 36.

In step 605, the hardware security module 32 transmits the encrypted authentication data packet 36 (FIG. 3) comprising the PI digit data 37 and the hand-held identifier 38 (FIG. 3) to the data storage device 34 (FIG. 3). In step 606, the data storage device 34 transmits the encrypted authentication data packet 36 to the validating entity computing device 15 (FIG. 1). In step 607, the control logic 45 of the validating entity computing device 15 decrypts the encrypted authentication data packet 36 and stores the PI digit data 37 (FIG. 4) and the hand-held identifier 38 (FIG. 4) as authentication data 48 (FIG. 4). Notably, the PI digit data 37 and the hand-held identifier 38 are stored in the authentication data 48 corresponding to one another so that if the hand-held identifier 38 is searched for in the authentication data 48, the PI digit data 37 is located or if the PI digit data 37 is searched for in the authentication data 48, the hand-held identifier 38 is located.

In step 608, the control logic 45 of the validating entity computing device 15 uses either the hand-held identifier 38 or the PI data 37 to locate the account of the consumer using the hand-held device 13 in the account data 29. If the hand-held identifier 38 corresponds to (e.g., matches) the same account as the PI digit data 38 in step 610, the control logic 45 transmits an approval data packet 46 (FIG. 4) comprising an approval identifier 401 (FIG. 4) and an approval code 400 (FIG. 4) to the NFC hand-held device 13 indicating that the consumer has been authenticated in step 611.

In response, the NFC hand-held device 13 may perform an operation to notify the consumer that the $1000 purchase of the TV set on his/her account has been approved. In this regard, the NFC hand-held device 13 may play a sound (e.g., a beep) or pop up a window on the output interface 22 (FIG. 2), for example and LCD display device.

In step 612, the control logic 45 stores the NFC hand-held identifier 38 and the approval code 400 in the verification data 14. If the hand-held identifier 38 is not matched to the same account as the PI digit data 37 in step 609, the control logic 45 transmits a declination data packet 402 to the NFC hand-held device 13 indicating that the consumer has not been authenticated in step 610.

In response, the NFC hand-held device 13 may perform an operation to notify the consumer that the $1000 purchase of the TV set on his/her account has been declined. In this regard, the NFC hand-held device 13 may play a sound (e.g., a beep) or pop up a window on the output interface 22 (FIG. 2), for example and LCD display device.

Figure 6C:
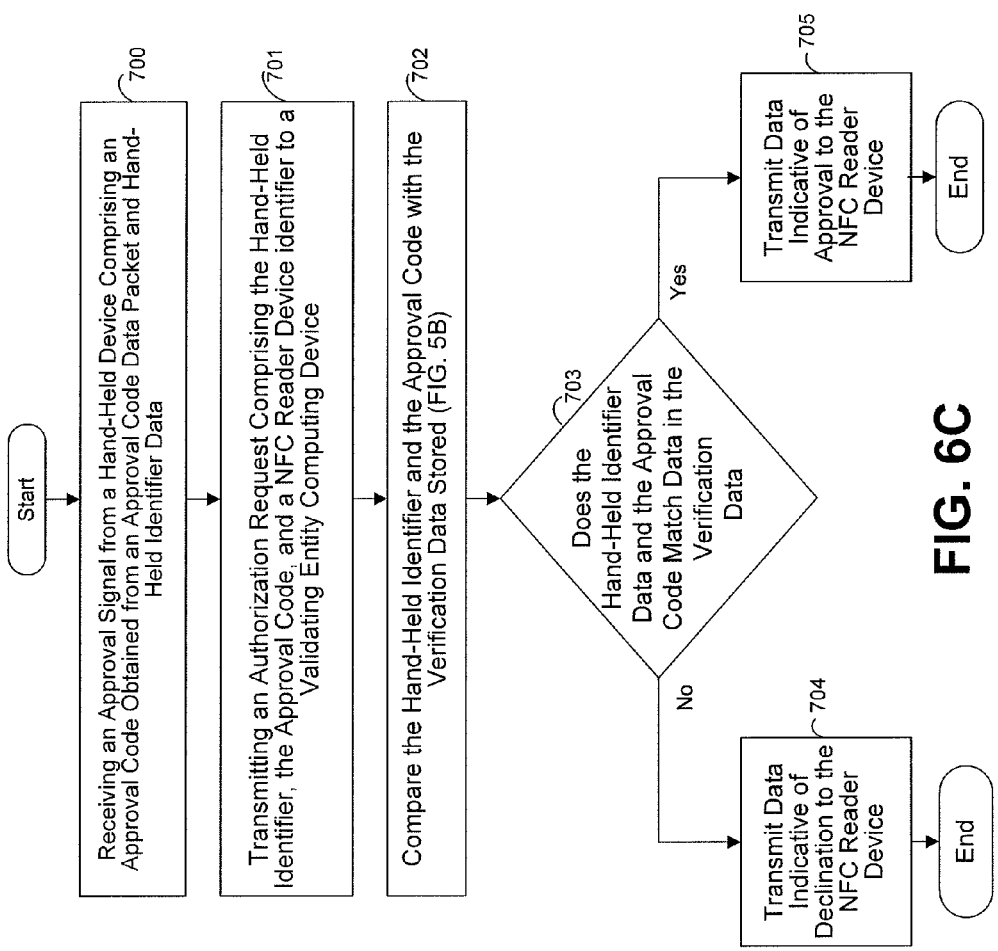
FIG. 6C is a flow chart illustrating an exemplary method implemented by an NFC merchant reader, such as is depicted by FIG. 1

FIG. 6C is a flowchart depicting exemplary architecture and functionality of the financial payment system 16 (FIG. 1) for settling a purchase with a merchant. Notably, once the consumer receives notification by his/her hand-held device 13, the consumer can finalize the purchase. To effectuate this, the consumer again places his/her hand-held device 13 within close proximity to the NFC reader device 12.

In response, in step 700, the NFC reader device 12 (FIG. 1) receives an approval request 100 (FIG. 1) from the NFC hand-held device 13 (FIG. 1) comprising the approval code 27 (FIG. 2) obtained from the approval code data packet 28 (FIG. 2) and the hand-held identifier 38.

In step 701, the NFC reader device 12 transmits a payment request comprising the approval code 27, the hand-held identifier 38, and an NFC reader device identifier to the validating entity computing device 15. In step 702, the validating entity computing device 15 compares the approval code 27 and the hand-held identifier 38 with verification data 14 stored from the previous authentication process described with reference to FIG. 6B. If the hand-held identifier 38 and the approval code 27 match an entry in the verification data 14 in step 703, the validating entity computing device 15 transmits data indicative of approval to the NFC reader device 12 in step 704. If they do not match in step 703, the validating entity computing device 15 transmits data indicative of declination to the NFC reader device 12 in step 705.

If the payment request is approved, the clerk at the NFC reader device 12 provides the consumer with the TV, and the transaction is finalized. If the payment request is not approved, the consumer does not get the goods and/or services.

Now, therefore, the following is claimed:

1. A system for authenticating near field communication (NFC) transactions, comprising:
an NFC merchant reader configured to provide an electromagnetic field; and an NFC hand-held device configured to sense the electromagnetic field and to transmit an initialization request to a data server system in response to a first detection of the electromagnetic field, the initialization request for requesting the data server system to transmit to the NFC hand-held device location data identifying locations of graphical icons within a graphical key pad, the NFC hand-held device configured to display the graphical key pad based on the location data and to receive user input for selecting at least one of the graphical icons, the selected graphical icon corresponding to a character of a personal identifier (PI) for a financial transaction, the NFC hand-held device further configured to wirelessly transmit location data indicative of a location of the selected graphical icon within the graphical key pad, the NFC hand-held-device further configured to receive an approval code transmitted to the NFC hand-held device in response to the location data indicative of the location of the selected graphical icon within the graphical key pad, the approval code for use in approving a payment for the financial transaction, the NFC hand-held device further configured to transmit the approval code to the NFC merchant reader in response to a second detection of the electromagnetic field, wherein the NFC merchant reader is configured to transmit a payment request comprising the approval code for requesting approval of the payment for the financial transaction.

2. The system for authenticating the NFC transactions of claim 1, wherein the NFC merchant reader comprises an NFC chip that actively communicates with an NFC chip in the NFC hand-held device.

3. The system for authenticating the NFC transactions of claim 1, further comprising a hardware security module configured to receive the location data indicative of the location of the selected graphical icon, the hardware security module further configured to translate the location data indicative of the selected graphical icon into the PI and transmit the hand-held identifier and the PI.

4. The system for authenticating the NFC transactions of claim 3, further comprising a validating entity device configured to receive the PI and the hand-held identifier, the validating entity further configured to determine whether the hand-held identifier corresponds to an account and to determine whether the account is associated with the hand-held identifier and the PI.

5. The system for authenticating the NFC transactions of claim 4, wherein the validating entity device is further configured to randomly generate the approval code and transmit the approval code to the hand-held device.

6. The system for authenticating the NFC transactions of claim 1, further comprising a validating entity computing device configured to authenticate the user based on the location data wirelessly transmitted by the NFC hand-held device, the validating entity computing device further configured to transmit the approval code in response to authentication of the user by the validating entity computing device.

7. The system for authenticating the NFC transactions of claim 6, wherein the validating entity computing device is configured to receive the payment request and to authorize the payment based on the approval code.

8. The system for authenticating the NFC transactions of claim 7, wherein the data server system is configured to translate the location data indicative of the location of the selected graphical icon into the PI and to transmit the PI to the validating entity computing device.

9. The system for authenticating the NFC transactions of claim 8, wherein the data server system is configured to transmit the PI to the validating entity via a network.

10. The system for authenticating the NFC transactions of claim 9, wherein the validating entity is configured to transmit the approval code to the data server system via the network, and wherein the data server system is configured to transmit the approval code to the NFC hand-held device.

11. A method for authenticating near field communication (NFC) transactions, comprising:
sensing an electromagnetic field from an NFC merchant reader by an NFC hand-held device;
transmitting an initialization request to a data server system in response to the sensing, the initialization request for requesting the data server system to transmit to the NFC hand-held device coordinate data identifying coordinates of graphical icons in a graphical key pad;
displaying the graphical key pad by the hand-held device based on the coordinate data;
prompting a user for a personal identifier (PI) based on the displaying;
inputting into the NFC hand-held device at least one character of the PI, the inputting comprising selecting at least one of the graphical icons;
wirelessly transmitting from the NFC hand-held device coordinate data indicative of coordinates of the selected graphical icon;
translating the coordinate data indicative of the coordinates of the selected graphical icon into the PI;
transmitting an approval code to the NFC hand-held device based on the translated PI;
transmitting the approval code from the NFC hand-held device to the NFC merchant reader in response to a detection of the electromagnetic field by the NFC hand-held device;
transmitting, from the NFC merchant reader, a payment request comprising the approval code for requesting approval of a payment for a financial transaction;
approving the payment for the financial transaction in response to the payment request and based on the approval code; and
electronically transferring funds based on the approving.

12. The method of claim 11, further comprising wirelessly transmitting an approval request comprising the approval code and an identifier of the NFC hand-held device to the NFC merchant reader.

13. The method of claim 11, further comprising receiving the approval request by the NFC merchant reader.

14. A method for authenticating near field communication (NFC) transactions, comprising:
sensing an electromagnetic field from an NFC merchant reader by an NFC hand-held device;
wirelessly transmitting, from the NFC hand-held device in response to the sensing, an initialization request for requesting data identifying locations of graphical icons in a graphical key pad;
displaying the graphical key pad by the NFC hand-held device based on the data indicative of the locations of the graphical icons;
prompting a user for a personal identifier (PI) based on the displaying;
inputting into the NFC hand-held device at least one character of the PI, the inputting comprising selecting at least one of the graphical icons;
wirelessly transmitting from the NFC hand-held device data indicative of a location of the selected graphical icon within the graphical key pad;

translating the data indicative of the location of the selected graphical icon into the PI;

transmitting an approval code to the NFC hand-held device based on the translated PI;

transmitting the approval code from the NFC hand-held device to the NFC merchant reader in response to a detection of the electromagnetic field by the NFC hand-held device;

transmitting, from the NFC merchant reader, a payment request comprising the approval code for requesting approval of a payment for a financial transaction;

approving the payment for the financial transaction in response to the payment request and based on the approval code; and electronically transferring funds based on the approving.

* * * * *